Patented Mar. 11, 1941

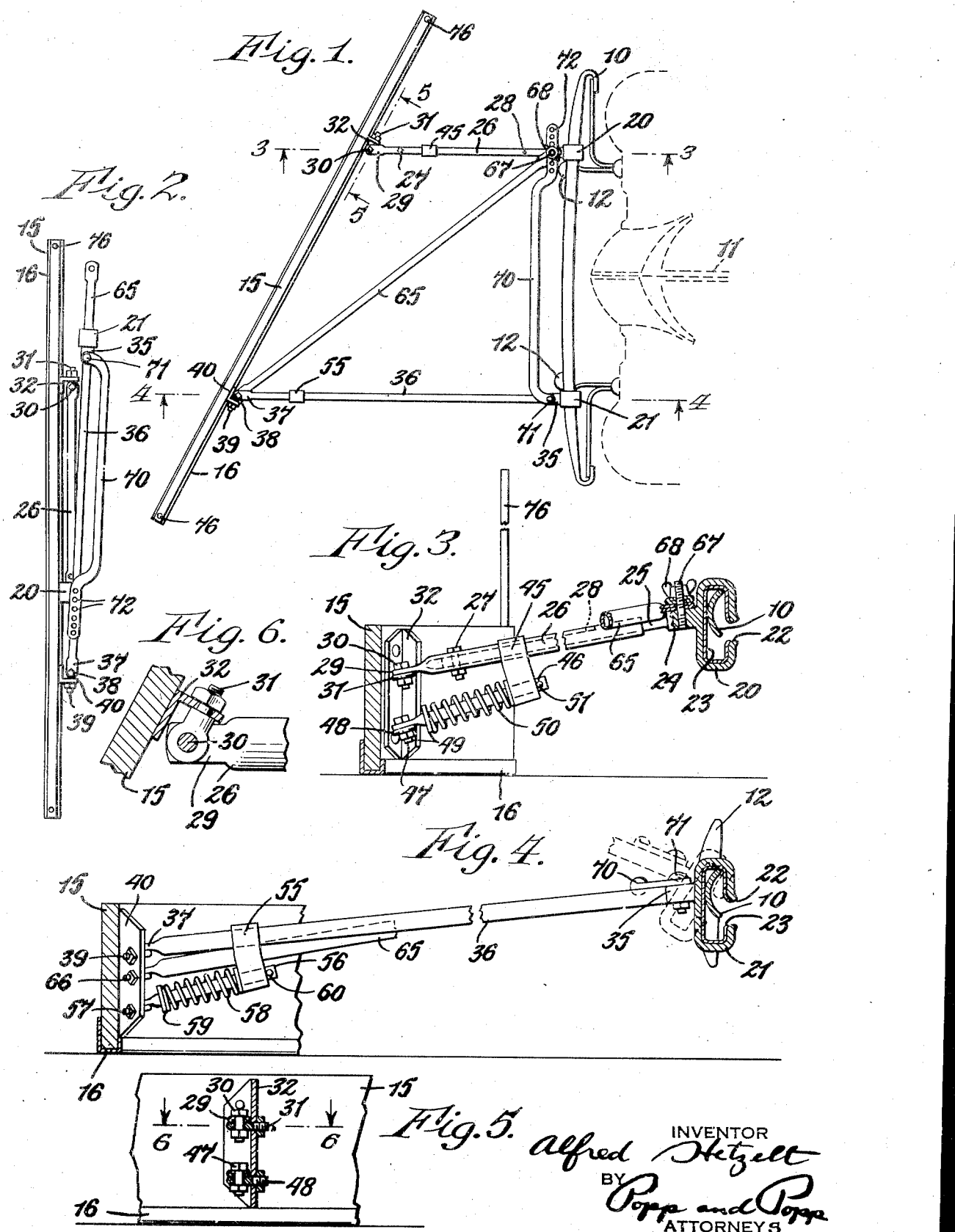

2,234,645

UNITED STATES PATENT OFFICE 2,234,645

SNOWPLOW

Alfred L. Hetzelt, Kenmore, N. Y.

Application July 8, 1938, Serial No. 218,167

9 Claims. (Cl. 37—42)

This invention relates to a snowplow and more particularly to a light snowplow which can be easily attached to the bumper bars of pleasure cars.

The removal of snow from driveways by home owners and also clearing snow from relatively small areas, such as around gasoline stations, wharves and the like is a laborious job when done by hand. The present invention is primarily directed to this field of snow removal and in general consists of a light but durable plow which can be easily attached to and detached from the bumper bar of a pleasure car, thereby enabling the home owner to quickly clear his driveway after which he can remove the snowplow and use his car for its usual purposes.

One of the principal objects of this invention is, therefore, to provide such a snowplow which is very light in weight and at the same time of strong and durable construction and which can be quickly and easily applied to or detached from the front bumper bar of an automobile.

Another object of the invention is to provide such a plow which can be used to remove the snow under all normal conditions of snowfall and which will leave the driveway or areaway in a completely cleared condition.

Another object of the invention is to provide such a plow in which there is no danger or breaking or injuring any of the parts in the event that an obstacle of low height, such as a curb or broken piece of pavement, is encountered, the plow being so designed as to yield and pass over such an obstruction.

Another object of the invention is to provide such a snowplow in which the parts are rigidly braced and so attached to the bumper of the automobile as to be held rigidly thereon, this permitting the automobile and plow to be steered around curves without danger of the snowplow sliding sidewise.

Another object is to provide such a plow in which the furrow board of the plow can be set at any angle as the conditions of snowfall or the width of the driveway may dictate and which can be applied to any usual type or width of bumper bar, the supporting mechanism being made adjustable for this purpose.

Another aim is to provide such a plow in which the various parts fold together when not in use, thereby to provide a compact structure which can be readily stored away or shipped.

Another aim is to provide such a snowplow which is low in cost of manufacture so as to enable it to be sold at low cost and which will stand up under conditions of severe and constant use without breaking or otherwise getting out of order.

In the accompanying drawing:

Fig. 1 is a top plan view of the snowplow made in accordance with my invention and attached to the bumper bar of an automobile.

Fig. 2 is a view similar to Fig. 1 showing the parts of the snowplow folded up so as to facilitate its transportation and storage.

Figs. 3, 4 and 5 are vertical sections, taken on the correspondingly numbered lines on Fig. 1.

Fig. 6 is a framgentary horizontal section, taken on line 6—6, Fig. 5.

The snowplow is attached to the front bumper 10 of an automobile illustrated by dotted lines 11. The bumper bar 10 can be of any usual and well known form and is shown as having the usual vertical horns 12 which are mounted upon the bumper bar. These horns extend vertically and their normal function is to insure engagement of the bumper structures in a collision even though the bumper bar of one automobile may be higher than the bumper bar of the other automobile. In the present instance, these horns serve to prevent lateral movement of the plow.

The plow forming the subject of the present invention includes a furrow board 15 which is shown as being made of wood, although it can also be made of other materials. This furrow board is preferably provided along its lower edge with a shoe 16 in the form of a metal channel which embraces the lower edge of the furrow board 15 so as to provide a wearing surface and also to prevent the furrow board 15 from being splintered in use. The furrow board 15 is normally held in a substantially vertical plane and at an angle to the line of movement as indicated in Fig. 1 and for this purpose is suspended from the bumper bar 10 of the automobile by a structure which is preferably constructed as follows:

The numerals 20, 21 represent a pair of jaws in the form of castings which are C-shaped in vertical section as best shown in Fig. 3 so as to provide an opening 22. These jaws are applied to the bumper bar and to prevent injury to the finish of the bumper bar these jaws are internally faced with a soft material, such as rubber, indicated at 23. Each of the jaws is formed to provide a forwardly extending boss and to the end of the boss 24 of the clamping jaw 20 is welded a rod 25 which extends forwardly and downwardly as illustrated in Fig. 3. This rod is telescopically received within a tube 26, the rod 25 and tube 26 being connected by a bolt 27 which can be received in one of a plurality of holes 28 provided in the tube 26 so that the effective length of the rod 25 and tube 26 can be adjusted. The forward end of the tube 26 is flattened to provide a generally horizontal eye 29 through which a generally vertical bolt 30 passes. This bolt 30 connects with an eye bolt 31 which is secured to the rearwardly extending flange of a vertical angle bar 32, this angle bar being secured to the rear side of the furrow board 15 in any suitable manner.

The boss 35 of the other jaw 21 is welded to a tube 36 which extends forwardly and downwardly and at its front end is flattened to form a generally horizontal eye 37 which is connected by a generally vertical bolt 38 to an eye bolt 39 which, like the eye bolt 31, is secured to the rear flange of an angle bar 40 secured to the rear side of the furrow board 15. The angle bars 32 and 40 are arranged at opposite sides of the furrow board and the eye bolts 31 and 39 are preferably arranged near the upper ends of the angle bars 32 and 40 and their bolt connections with the tubes 26 and 36 sufficiently loose to permit the lower part of the furrow board to yield rearwardly when an obstacle, such as a fault in the pavement, is encountered. The furrow board, however, is normally held in the vertical position shown by spring means which are preferably constructed as follows:

At the right hand side of the plow a bracket 45 is carried by the tube 26 and is formed to provide an eye or slideway which receives a short rod 46. The front end of the rod 46 is flattened and formed to provide an eye which is connected by a bolt 47 with an eye bolt 48 secured to the rearwardly projecting flange of the angle plate 32. A washer 49 is provided at the front end of the rod 46 and between this washer 49 and the bracket 45 a helical compression spring 50 is interposed. It will be seen that the spring 50 tends to urge the lower part of the furrow board forwardly, this movement being limited by a stop pin 51 which is carried by the rod 46 and engages the rear side of the bracket 45 when the furrow board is in the vertical position shown.

A similar spring arrangement is provided at the left hand of the plow, the tube 36 carrying a bracket 55 which slidingly supports a rod 56 the front end of which is connected to an eye bolt 57 secured to the rearwardly projecting flange of the angle plate 40. A compression spring 58 is interposed between the bracket 55 and a washer 59 and a stop pin 60 limits the forward movement of the rod 56 under the influence of the spring 58 so as to hold the furrow board in a substantially vertical position.

In order to provide the necessary rigidity a diagonal brace is provided, this brace being in the form of a tube 65 which is flattened at its opposite ends and connected at its front end to an eye bolt 66 carried by the rearwardly projecting flange of the angle plate 40 and at its rear end to a stud 67, a wing nut 68 being provided to hold the diagonal brace 65 in position on this stud. To further strengthen the structure and to prevent slippage on the bumper bar of the automobile, a cross brace 70 is provided, this cross brace being preferably of tubular form and flattened at its opposite ends. One end of this cross brace 70 is secured by a bolt 71 to the boss 35 of the jaw 21 while the opposite end is formed to provide a series of holes 72 any of which are fitted over the stud 67. In order to secure a more compact structure when folded the cross brace 70 is also arched as shown.

In order to facilitate the use of the plow the opposite ends of the furrow board 15 are preferably provided with vertically extending holes into which small poles 76 can be inserted. With most modern cars the furrow board 15 is not visible from the driver's seat and these poles aid in locating the position of the furrow board.

In setting up the plow for use the owner of the automobile lifts the plow so as to catch the upper part of the jaws 20, 21 over the bumper bar 10, as illustrated by dotted lines in Fig. 4. Upon then lowering the structure the bumper bar is caught within these jaws, as illustrated by full lines in Figs. 3 and 4. The owner then brings the jaws 20 and 21 up against the horns 12 on the bumper bar and then fits the studs 67 into the corresponding hole 72 of the cross brace 70 so that the jaws 20 and 21 will be held against the horns 12 and the plow prevented from moving sidewise along the bumper bar. The wing nut 68 is then tightened so as to secure the cross brace 70 and the diagonal brace 65 in position. The owner then determines the angle at which the furrow board will be set, this depending primarily upon the width of the driveway to be plowed, and adjusts the telescoping rod 25 along the tube 26 to secure the desired angle of the furrow board 15. This angle is maintained by passing the bolt 27 through either of the holes 28 provided in the tube 26.

The owner is then ready to plow his driveway by starting the car and moving it along with the plow attached. It will be noted that the tubes connecting the furrow board 15 with the bumper bar 10 extend downwardly from the bumper bar. This insures that the furrow board is held in engagement with the pavement to be plowed and assures the complete removal of all of the snow. As the plow is moved along the snow is moved along the furrow board and piled at one side. If an obstacle, such as a break in the pavement, is encountered, the furrow board will yield, its lower edge moving rearwardly against the resistance of the compression springs 50 and 58 until the furrow board clears the obstruction after which it is returned to its normal upright position by these springs, this normal upright position being determined by the stop pins 51 and 56. In order to permit such movement of the various pivotal connections the connecting bolts are made sufficiently loose so that the furrow boards will freely move to an inclined position in clearing obstructions. It will also be seen that the plow can be used in plowing curves, the clamping jaws 20 and 21 being firmly held between the horns 12 on the bumper bar for this purpose. In negotiating such curves and also in straight plowing, the guide posts 76 provided at the end of the furrow board materially aid since these guide posts inform the driver of the position of the furrow board and thereby enable him to avoid running into obstructions.

After the driver has finished plowing his driveway he lifts the furrow board until the clamping jaws 20 and 21 are brought to the dotted line position shown in Fig. 4, in which position the jaws can be lifted free from the bumper bar. Since the plow has been properly adjusted to fit his particular bumper bar it is unnecessary for him to disturb the setup condition of the plow and he can set it in his garage until the next snowfall. When he again wishes to plow his driveway it is merely necessary for him to pick up the plow, fit the jaws 20 and 21 over the bumper bar and lower it to the ground, this being, of course, a very simple matter and taking very little time.

With the arrival of spring it is desirable to put the plow into more compact form. To do this the owner of the car removes the cross brace 70 and the diagonal brace 65 from the stud 67, whereupon the arms and braces of the plow can be collapsed to the position shown in Fig. 2, the plow in this condition being readily stored away over the summer. Obviously, of course, the collapsing of the plow, as illustrated in Fig. 2, facilitates the packing of the plows for sale.

From the foregoing it will be seen that the present invention provides a plow which is very light in weight and is at the same time strong and durable and particularly adapted for occasional use by a home owner in that it is quickly fitted to the bumper bar of a pleasure car and equally quickly removed. Further, the plow is efficient in operation, clearing, in a few minutes, a driveway or areaway, the clearing of which by hand shoveling would be an arduous task. Further, by the downward inclination of the supporting members from the bumper bar of the automobile the furrow board is held in clean engagement with the pavement so as to remove all of the snow and at the same time if a low obstruction is encountered the furrow board will fold up toward a horizontal position to clear the obstruction after which it is immediately returned to its normal upright position by the compression spring backing for the lower part of the furrow board.

While I have shown and described a specific embodiment of my invention it is to be understood that the invention is not to be limited to the form of the invention shown but is to be accorded the full range of equivalents comprehended by the accompanying claims.

I claim as my invention:

1. A snowplow of the character described, comprising a furrow board adapted to traverse the surface to be cleared, a compression bar pivotally secured to the rear of said furrow board near one end thereof and extending rearwardly and upwardly therefrom, a telescopic compression bar pivotally secured to the rear of said furrow board near the opposite end thereof and extending rearwardly and upwardly therefrom, means for adjusting the effective length of said telescopic compression bar, a diagonal brace connected at its rear end to the rear end of one of said compression bars and connected adjacent the front end of the other of said compression bars, quick detachable means for connecting the rear ends of said compression bars with the bumper bar of an automobile, a transverse bar arranged parallel with said bumper bar, means connecting one end of said transverse bar with the rear end of one of said compression bars and means adjustably connecting the opposite end of said transverse bar with the rear end of the other of said compression bars.

2. A snowplow of the character described, comprising a furrow board adapted to traverse the surface to be cleared, a compression bar pivotally secured to the rear of said furrow board near one end thereof and extending rearwardly and upwardly therefrom, a telescopic compression bar pivotally secured to the rear of said furrow board near the opposite end thereof and extending rearwardly and upwardly therefrom, means for adjusting the effective length of said telescopic compression bar, a diagonal brace connected at its rear end to the rear end of one of said compression bars and connected adjacent the front end of the other of said compression bars, quick detachable means for connecting the rear ends of said compression bars with the bumper bar of an automobile, a transverse bar arranged parallel with said bumper bar, means connecting one end of said transverse bar with the rear end of one of said compression bars and means adjustably connecting the opposite end of said transverse bar with the rear end of the other of said compression bars, said adjustable connection comprising a plurality of holes provided at the end of said transverse bar and a stud provided at the rear end of the corresponding compression bar and arranged to fit into any of said holes.

3. A snowplow of the character described, comprising a furrow board adapted to traverse the surface to be cleared, a structure in rear of said furrow board and connected therewith and means for removably connecting said structure with the bumper bar of an automobile comprising a pair of rearwardly opening C-shaped jaws secured to said structure, the upper part of each of said C-shaped jaws being adapted to be fitted over the bumper bar upon lifting said furrow board and structure to an inclined position and the lower part of each of said C-shaped jaws being adapted to pass under the bumper bar upon lowering said furrow board and structure to the ground.

4. A snowplow of the character described, comprising a furrow board adapted to traverse the surface to be cleared, a pair of bars extending upwardly and rearwardly from said furrow board and secured in horizontally spaced relation thereto, means for holding the rear ends of said bars in spaced relation and quick detachable means for connecting the rear ends of said bars with the bumper bar of an automobile, comprising a rearwardly opening C-shaped jaw secured to the rear end of each of said bars, said bumper bar being adapted to be fitted into said jaws upon lifting said furrow board to an inclined position, fitting the upper part of said jaws over said bumper bar and then permitting the furrow board to drop to the surface to be cleared.

5. A snowplow of the character described, comprising a furrow board adapted to traverse the surface to be cleared, a pair of vertically extending flanges projecting rearwardly from said furrow board and each located near one end of the furrow board, a compression bar pivotally secured to one of said flanges and extending upwardly and rearwardly therefrom, a telescopic compression bar pivotally secured to the other of said flanges and extending upwardly and rearwardly therefrom, a diagonal brace removably secured to the rear end of one of said compression bars, means connecting the front end of said diagonal brace with the flange connected to the other of said compression bars, a transverse bar connected at one end to the rear of one of said compression bars and adjustably connected with the rear end of the other of said compression bars, spring means carried at the front end of each of said compression bars and connected to the lower part of the corresponding flange and urging said furrow board forwardly into a generally vertical position and quick detachable means for connecting the rear end of each of said compression bars with the bumper bar of an automobile comprising a rearwardly opening C-shaped clamp secured to each of said compression bars and adapted to be fitted over said bumper bar, said compression bars, diagonal brace and transverse bar being adapted to be folded into substantially parallel relation to said furrow board.

6. A light weight snowplow of the character described adapted to be attached to pleasure cars, comprising a single furrow board extending the full width of the car and arranged to traverse the surface to be cleared, a pair of vertically extending flanges projecting directly rearwardly from said furrow board and each located near one end of the furrow board, a bar pivotally secured to each flange and extending directly upwardly and rearwardly therefrom, quick detachable means for connecting the rear ends of said bars exclusively with the front bumper bar of said car, the pivotal connection between said bars and flanges being below the plane of said bumper bar and spring means mounted on the front end of each of said rearwardly extending bars and connected to the lower part of said corresponding flange to urge said furrow board into an upright position.

7. A light weight snowplow of the character described adapted to be attached to pleasure cars, comprising a single furrow board extending the full width of the car and arranged to traverse the surface to be cleared, a pair of bars extending directly upwardly and rearwardly from said furrow board, quick detachable means for connecting the rear ends of said bars exclusively with the bumper bar of said car, pivot means having vertical axes for securing the front ends of said pair of bars to the rear of said furrow board, and a single diagonal brace pivotally connected by a pivot having a vertical axis to the rear end of one of said pair of bars and at its front end to the rear of said furrow board and adjacent the front end of the other of said pair of bars, said single diagonal brace constituting the sole bracing means for resisting movement of said furrow board laterally of the car, said pivotal connections of said compression bars and diagonal brace permitting said compression bars and brace to be folded horizontally into substantial parallel relation with said furrow board.

8. A light weight snow plow of the character described adapted to be attached to pleasure cars, comprising a single furrow board extending the full width of the car and arranged to traverse the surface to be cleared, a pair of bars extending directly upwardly and rearwardly from said furrow board, quick detachable means for connecting the rear ends of said bars exclusively with the bumper bar of said car and pivot means for securing the front ends of said pair of bars to the rear of said furrow board and a single diagonal brace connected at its rear end to the rear end of one of said pair of bars and pivotally connected at its opposite end to the furrow board adjacent the pivotal connection thereto of the other of said pair of bars, said single diagonal brace constituting the sole bracing means for resisting movement of said furrow board laterally of the car.

9. A light weight snowplow of the character described adapted to be attached to pleasure cars, comprising a single furrow board extending the full width of the car and arranged to traverse the surface to be cleared, a compression bar pivotally secured to the rear of said furrow board near one end thereof and extending rearwardly and upwardly therefrom, a telescopic compression bar, quick detachable means for connecting the rear ends of said compression bars exclusively with the bumper bar of said car, and a single diagonal brace connected at its rear end to the rear end of said telescopic bar and at its front end pivotally to the rear of said furrow board adjacent the pivotal connection thereto of the other of said compression bars, said single diagonal brace constituting the sole bracing means for resisting movement of said furrow board laterally of the car.

ALFRED L. HETZELT.